Jan. 2, 1968   P. BELOKIN, JR   3,360,882
FISH LURE
Filed Feb. 18, 1965
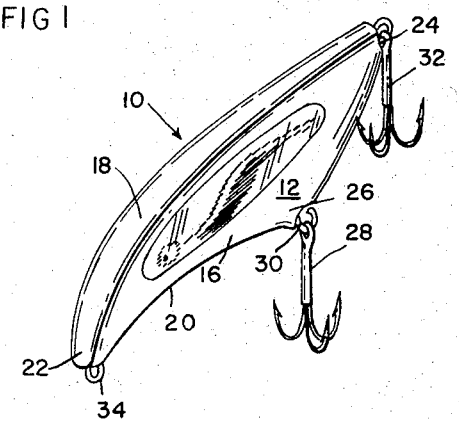
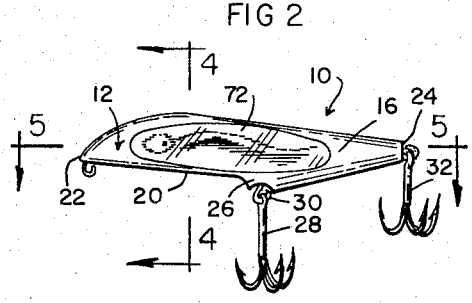
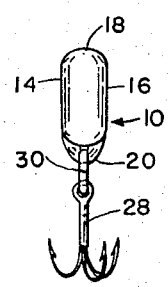
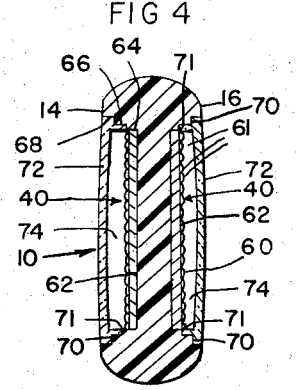
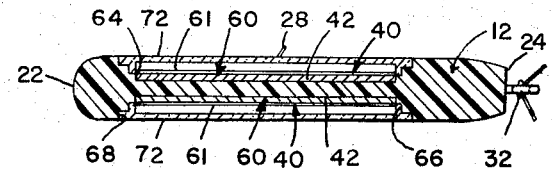
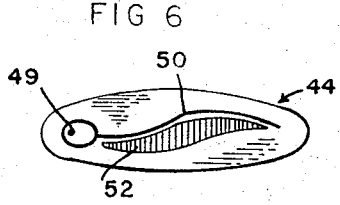
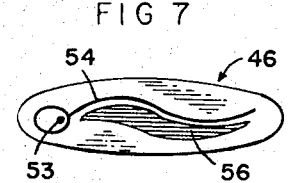
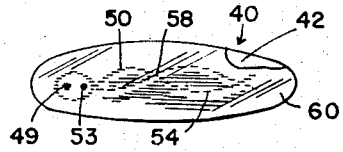
INVENTOR
PAUL BELOKIN JR.

United States Patent Office 3,360,882
Patented Jan. 2, 1968

3,360,882
FISH LURE
Paul Belokin, Jr., 6919 W. 43rd St.,
Berwyn, Ill. 60402
Filed Feb. 18, 1965, Ser. No. 433,711
4 Claims. (Cl. 43—42.33)

ABSTRACT OF THE DISCLOSURE

A fish lure having a lineoform lenticular picture viewing screen separated from a transparent viewing window by a gas body to provide a high refractory relationship at inside window surfaces and the outside pictures surfaces that purveys animation for a fish moving relative to the lure.

---

The present invention relates to fish lures and has particular reference to a novel means whereby one or more changeable display devices embodying lenticular viewing screens may be applied to the body portion of a fish lure, the application being such that the display device, or devices, will retain their effectiveness with relative movement between the line and a fish when the lure is submerged in water.

There has long been known and available for various uses a type of picture display device wherein a composite picture, comprised of a linear dissection and alternate arrangement of the dissected elements of two master pictures, is viewed through a lenticular viewing screen consisting of a series of optical half-cylinders, the net result being to produce an illusion of motion or animation as the position of the lenticular viewing screen is changed relative to the line of vision. Additionally, especially where the master pictures from which the dissections are made represent images from separate points of view, an illusion of depth, i.e., of a three dimensional nature, is created.

It is not known whether the use of a changeable display device of the character briefly outlined above has been considered for use in connection with a fish lure for the purpose of attracting fish. It is believed that if there has been such consideration it has been of unsatisfactory duration due to the obvious fact that the indices of refraction of water, or other liquids, and of glass, or other transparent lens-forming materials, are approximately identical so that submergence of a lens in a liquid is tantamount to complete obliteration of the lens effect. A changeable picture display device, submerged in water, therefore gives no illusion of either animation or depth, whether the same be viewed from within or without the body of water.

The present invention is designed to overcome the above-noted physical and optical limitation that is attendant upon the possible use of changeable picture display devices when submerged in liquids thus making it possible to incorporate such devices with fish lures in an effective manner so that the fish, when viewing the lures will be attracted thereto by whatever impulse or reaction may be initiated by perception of the displays.

Due to the reflective nature of a lenticular changeable display device of the type under consideration, when such a display device is applied to a fish lure according to the present invention, the display device is the predominating visual target for the fish and the general outline of the lure becomes of secondary importance. In fact, it is scarcely visible to the fish, or at least, it is entirely unnoticed in the light of the more luminous display device. Thus, the body portion of the lure, a swell as the ensnaring hook or hooks associated therewith, and any live or other bait which may be applied to the hook for olfactory attraction, will remain invisible to the fish so that the display, for all intents and purposes, will constitute the dominant attractive media and will consume the undivided attention of the fish.

It is well known to all experienced fisherman that a moving lure will attract a fish more readily than will a stationary lure. An adult fish who has survived several seasons in frequently fished waters is a wary fish and such things as dangling tripartite hooks and immobile bait are suspect. Therefor a stationary lure, embodying such hooks or bait, being immobile, are visible in detail since the fish has an opportunity to view the same at his discretion from all sides thereof and determine whether the same be genuine or spurious. Furthermore, a stationary bait, in the mind of a fish, is a dead morsel and most fish, being carniverous by nature, prefer a live morsel. Thus a moving bait is invariably more attractive to a fish than is a stationary one.

Because the fish lure of the present invention gives the illusion of animation and of depth, even when the lure is stationary, the animation being a product of relative motion of the fish rather than of the lure, the lure is attractive to the fish whether it remains stationary or is in motion. Conventional lures seldom are attractive to a fish unless the same are in motion for reasons outlined above. Since the lure gives the illusion of motion, even when stationary, the presence of dangling tripartite hooks and their associated bait, if any, are not noticed by the fish whose attention is entirely consumed by the supposedly mobile, albeit in fact stationary, animated visible display.

According to the present invention, to the end that the lenticular picture display device of the lure may not lose its optical effect, means are provided whereby the changeable picture display is separated from the surrounding water in which the lure remains submerged by a thin layer of a gaseous media such as air which has an index of refraction appreciably lower than the index of refraction of the transparent lens media. This is accomplished by causing the picture display device to be completely enclosed within a hermetically sealed chamber within the body of the lure, an outer window opening being provided through which the device may be viewed, the opening being closed by a transparent viewing window panel, and the latter being spaced from the picture display device. Thus, reflected light, emanating from the composite lineoform picture pattern will pass outwardly through the lenticular screen and undergo a first velocity and direction change in accordance with well-known optical phenomena, after which it will travel through the air chamber and pass outwardly through the transparent window panel. During passage through the transparent outer panel, this once-changed reflected light will undergo additional or augmenting velocity and direction changes due to the potential of the angles of incidence and emergence involved. However, whether the window would be normally of a positive meniscus or negative meniscus in shape, the side facing the image is concave and when the other side engages the water the window becomes plano-concave in its effect. This will occur because the velocity and direction changes at the convex or outer surface will cancel out due to contact with water and the reflected light will emerge from the surface of the fish lure with a divergence that widens the viewing angle for the fish while producing the desired animation of the picture subject from a point of view within the surrounding liquid media, just as though the media did not exist and the lure were to be viewed in open air. This divergence for wider viewing can be varied as desired by the depth of the concavity on the innerface of the window, it being appreciated that although the windows are referred to as lenses, they are more columnar than spherical due to their physical length.

The provision of a fish lure of the character briefly outlined above and possessing the stated advantages therefor being the principal object of the invention, a further object is to provide a lure which, except for the basic composite lineoform picture sheet of the display and whatever tripartite or other snare devices may be associated therewith, may be economically manufactured from inexpensive plastic materials by conventional injection or other molding processes, and easily assembled so that over-all manufacturing costs are low.

A still further object of the invention is to provide a fish lure which, although giving the illusion of animation over a wide viewing angle, is possessed of no moving parts whatsoever so that the same is unlikely to get out of order, and, once assembled, remains permanently effective as a lure and possesses substantially the same ruggedness and durability possessed by conventional one-piece or solid body fish lures.

Other objects and advantages of the invention, not at this time enumerated, will readily suggest themselves as the following description ensues.

In the accompanying single sheet of drawings forming a part of this specification, one illustrative embodiment of the invention has been shown.

In these drawings:

FIG. 1 is a perspective view of a fish lure constructed according to the principles of the present invention and embodying a changeable picture display device;

FIG. 2 is a side view of the fish lure of FIG. 1;

FIG. 3 is a front end view of the fish lure of FIG. 1;

FIG. 4 is an enlarged sectional view taken substantially along the line 4—4 of FIG. 2 showing a moderate concavo-convex shape of the viewing window;

FIG. 5 is an enlarged sectional view taken substantially along the line 5—5 of FIG. 2;

FIG. 6 is an enlarged plan view of one of two master pictures associated with the changeable picture display or "copy" embodied in the fish lure of FIGS. 1 to 3 inclusive;

FIG. 7 is a similar plan view to that of FIG. 6 but illustrating the other master picture or "copy"; and FIG. 8 is a composite print or copy adapted for use in connection with the lenticular viewing screen of the changeable picture display device and containing the delineation master pictures of FIGS. 6 and 7.

Referring now to the drawings in detail and in particular to FIGS. 1 to 3 inclusive a fish lure constructed according to the principles of the present invention has been designated in its entirety at 10 and it involves in its general organization a lure body 12 of conventional lure outline, which is to say that it is of streamline configuration and presents two broad-expense slightly dished convex side faces 14 and 16, a narrow bowed upper surface 18, and a similar slightly bowed bottom surface 20. The body 12 tapers to a relatively sharp point 22 at its forward end and to a blunt point 24 at its rear end. An offset 26 in the bottom surface 20 provides an anchor region for a depending tripartite fish hook 28 which is suspended from an embedded eyelet 30 which protrudes from the offset 26. A similar hook assembly 32 is provided at the extreme rear end of the body 12 and an anchor eyelet 34 is provided at the extreme forward end of the body for attachment to a suitable line (not shown).

The arrangement of hooks and eyelets thus far described is purely conventional and no claim is made herein to any novelty associated therewith or the outline thereof, the present invention being primarily concerned with the novel means whereby one or more changeable picture display devices, such as the devices designated in their entirety at 40 in FIGS. 4, 5 and 8 may be operatively applied to the lure body 12, and which means will now be more fully described and subsequently claimed.

Two identical changeable picture display devices 40 per se are employed in connection with the lure 10 and each is comprised of three parts, namely a composite print 42 in the form of a paper or other sheet (FIG. 8) on which there has been produced by a suitable printing, lithographing, photographing or other reproducing process, alternately interlined picture segments representing alternate increments or segments removed from two master copies 44 and 46 (FIGS. 6 and 7 respectively). In the particular picture display selected for illustrative purposes herein the removed segments are in the form of thin, horizontally extending lineations which completely traverse two different designs or pictures. If the lineations of FIG. 6 were to be successively designated from top to bottom as A, B, C, D, E etc., and the lineations of FIG. 7 were to be similarly designated as A', B', C', D', E', etc., then the composite lineations of FIG. 8 would be designated A, B', C, D', E, etc. Such lineation and delineation is conventional in connection with the art of making changeable picture displays and therefore it is deemed unnecessary to illustrate the actual lineations and delineations herein in detail, the schematic illustrations of FIGS. 6, 7 and 8 being sufficient to give an understanding of this well-known process. For a comprehensive understanding of such a process, reference may be had to United States patent to Anderson, No. 2,815,310, dated Dec. 3, 1957 and entitled "Process of Assembling in the Art of Changeable Picture Display Devices."

The particular display selected purely for exemplary purposes herein is one which involves fairly wide horizontal displacements in its animated effect with some overlapping. Specifically, the display is made up from a first design (FIG. 6) including a "fish-eye" 49 and a one-wave sinuous line 50 below which there is disposed a red colored mass 52, and a second design (FIG. 7) including a similar "fish-eye" 53 and one-wave sinuous line 54 below which there is disposed a blue colored mass 56. The sinuous line 54 commences with a crest and terminates with a trough, reading from left to right. The sinuous line 50 commences with a trough and terminates in a crest. The amplitude and frequency of the sine curve involved are the same so that there are vertical displacements in opposite directions in the composite print of "copy" of FIG. 8 on opposite sides of a common nodal point 58 (FIG. 8) with consequent overlapping regions.

The picture display device 40 further includes a lenticular viewing screen 60 (FIGS. 4 and 5) which is positioned over the composite print of FIG. 8 and consists of an integral sheet of lens-forming material embodying a series of contiguous segments 61 of cylinders which overlie the lineations of the composite print in the usual manner so that at certain given viewing angles, only the lineations of one design are visible and so that at other given viewing angles, only the lineations of the other design are visible. The viewing screen 60 may be formed of any suitable lens-forming material such as cellulose acetate, and it may be secured in position over the composite print of FIG. 8 by heat sealing or by a suitable transparent adhesive. The border outline of the selected composite design and consequently the outline of the picture display device 40 is of oval configuration to conform generally to the elongated configuration of the side faces 14 and 16 of the lure body 12. The picture display device 40 per se and considered as a unit, therefore in the form of a flat, thin oval plaque or plate.

As best seen in FIGS. 4 and 5, in order to accommodate two of the changeable picture display devices 40, one on each side of the lure body 12, the opposite sides of the body are recessed, each recess providing a flat bottom wall surface 62 having an oval shape in conformity with the oval configuration of the display device 40. The side wall of each oval recess is of stepped configuration and provides first, second and third wall surfaces 64, 66 and 68 respectively, these surfaces being curved and being progressively offset outwardly in a radial direction. The juncture regions between the wall surfaces 66 and 68 at the wall surfaces 64 and 66 define laterally facing seating shoulders 70 and 71, respectively, for a transparent window panel 72 which may be formed of Lucite or other suitable plastic material and which may be cemented in position on the shoulders 70 and 71 and against the wall surfaces 66 and 68 so as to define a hermetically sealed chamber 74 within the recess. The picture display device 40 is positioned flat against the bottom wall surface 62 to which it may be cemented or otherwise secured and with the screen 60 facing outwardly so that it may be viewed through the window panel 72.

According to the present invention, retention of the changeable design feature of the picture display devices 40 when the lure 10 is submerged in a body of liquid such as water is made possible by providing a dead air space between the outer surface of the each lenticular screen 60 and the inside surface of its associated window panel 72. Toward this end, the depths of the various wall surfaces 64, 66 and 68 are such that when the window panel 72 is seated upon the shoulder 70 and the picture display device 40 is seated upon the bottom wall surface 62, this dead air space will result. Thus, even though the index of refraction of the liquid within which the lure is submerged may be substantially the same as the index of refraction of the transparent lenticular viewing screen 40, reflected light issuing from the surface of the composite lineoform design will undergo three direction changes before it enters the liquid media. The first change will take place as the light emerges from the lenticular viewing screen 60; the second change will take place as it enters the transparent media of the window panel 72; and the third change will take place as it emerges from the window panel. The first direction change is a function of the angle of emergence of the light from the viewing screen 60; the second direction change is a function of the angle of incidence of light entering the transparent material of the window panel 72; and the third change is a function of the angle of emergence from the latter panel. Since the transparent window panel 72, in effect, constitutes a columnar-like concave element the divergent changes involved during passage of light into the window occur as an air-to-solid refraction and possible light deviation at the outer face is virtually cancelled out by water contact therewith in its passage from the window material to the liquid media. Divergence, however, will remain to increase the viewing angles involved within the liquid media particularly in a vertical direction.

Furthermore, the illusion of animation which is apparent from within the dead air space within the recess which houses the changeable picture display 40, is not adversely affected by the existence of the transparent window panel 72. In fact, in the absence of such a dead air space, any continuity of the transparent window panel and the transparent lenticular screen 60, would eliminate the desired animating refraction of these two members because their indices of refraction are substantially identical. Such, like water against the lenticular screen 60, would nullify the optical phenomena which form a basis for the changeable picture display involved herein.

The invention is not to be limited to the exact arrangement of parts shown in the accompanying drawings or described in this specification as changes in various changes in the details of construction may be resorted to without departing from the spirit of the invention. For example, the particular display pattern employed for producing the changeable picture device 40 may vary widely in its portrayal effect. If vertical displacements of the design in the viewing thereof from different angles are desired, the cylinder fragments of the lenticular viewing screen 60 will extend horizontally. If horizontal displacements are desired, then the cylinder fragments will extend vertically. Angular displacements may be attained by causing the cylinder fragments to extend on an incline. Irrespective of the particular character of the design involved, the essential features of the invention are at all times preserved. Therefore, only insofar as the invention has particularly been pointed out in the accompanying claims is the same to be limited.

What is claimed is:

1. In a fish lure of the character described, a lure body having a recess formed in one side thereof and presenting a continuous open rim, a transparent window panel closing said rim and, in combination with the wall surfaces of said recess, defining a hermetically sealed pocket within the confines of the lure body, a changeable picture display device of the composite lineoform lenticular type, fixedly secured within said pocket and having its viewing surface spaced from the inside face of said window panel, and a gaseous media disposed within said pocket in interface contact with said picture display and with the changeable picture display substantially filling the pocket.

2. In a fish lure of the character described, a lure body having a recess formed in one side thereof and presenting a continuous open rim, a transparent window panel having a concave inner face closing said rim, in combination with the wall surfaces of said recess, defining a hermetically sealed pocket within the confines of the lure body, a changeable picture display device of the composite linoform lenticular type, fixedly secured within said pocket and having its viewing surface spaced from the inside face of said window panel, and a gaseous media disposed within said pocket in interface contact with said picture display and with the changeable picture display substantially filling the pocket.

3. In a fish lure of the character described, a lure body having a recess formed in one side thereof, said recess having a flat bottom wall surface surrounded by a continuous marginal side wall surface presenting an open rim, a transparent window panel fitting snugly within said rim and, in combination with said bottom wall surface and side wall surface, defining a hermetically sealed pocket filled with air within the confines of the lure body, and a changeable picture display device including a design sheet secured to said flat bottom wall surface and substantially coextensive therewith, and a transparent lenticular viewing screen superimposed on said sheet in interface contact with the air pocket, said viewing screen being spaced from said window panel with the general plane thereof extending in parallelism with the general plane of the window panel.

4. In a fish lure of the character described, a lure body having a recess formed in the opposite sides thereof, each recess having a flat bottom wall surface surrounded by a stepped marginal wall surface including first, second and third wall portions which are displaced radially outwardly and progressively in the order named, the third wall portion, in combination with the second wall portion, defining a continuous laterally facing seating shoulder, a transparent window panel seated upon said seating shoulder and, in combination with said flat bottom wall surface and marginal wall surface, defining a hermetically sealed internal chamber filled with air within the confines of the lure body, and a changeable picture display device including a design sheet secure to said flat bottom wall surface and substantially coextensive therewith, and a transparent lenticular view screen superimposed upon said sheet in interface contact with the air in said chamber, said changeable picture device substantially filling the space defined by said bottom wall surface and the first wall portion and being spaced from the window panel by a distance substantially equal to the depth of said second wall portion.

References Cited

UNITED STATES PATENTS

| | | | |
|---|---|---|---|
| 1,180,753 | 4/1916 | Zeigler | 43—42.32 X |
| 2,163,666 | 6/1939 | Carter | 43—42.33 |
| 2,593,792 | 4/1952 | Reckler | 43—42.33 X |
| 3,122,853 | 3/1964 | Koonz et al. | 43—42.33 X |

SAMUEL KOREN, *Primary Examiner.*

ALDRICH F. MEDBERY, *Examiner.*

D. J. LEACH, *Assistant Examiner.*